United States Patent
Curtis et al.

(10) Patent No.: US 10,198,047 B2
(45) Date of Patent: Feb. 5, 2019

(54) DATA STORAGE DEVICE CONNECTOR WITH INTEGRATED TEMPERATURE SENSOR

(71) Applicant: Dell Products, LP, Round Rock, TX (US)

(72) Inventors: Robert B. Curtis, Georgetown, TX (US); Chris E. Peterson, Austin, TX (US); Bernard D. Strmiska, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 381 days.

(21) Appl. No.: 14/946,440

(22) Filed: Nov. 19, 2015

(65) Prior Publication Data

US 2017/0147047 A1    May 25, 2017

(51) Int. Cl.
| | |
|---|---|
| *G06F 1/20* | (2006.01) |
| *G06F 1/18* | (2006.01) |
| *G05D 23/13* | (2006.01) |
| *G01K 7/16* | (2006.01) |
| *G01K 1/14* | (2006.01) |

(52) U.S. Cl.
CPC ............. *G06F 1/206* (2013.01); *G01K 1/14* (2013.01); *G06F 1/187* (2013.01)

(58) Field of Classification Search
None
See application file for complete search history.

(56) References Cited

U.S. PATENT DOCUMENTS

| | | | |
|---|---|---|---|
| 5,732,215 A | 3/1998 | Boutaghou et al. | |
| 6,029,119 A | 2/2000 | Atkinson | |
| 6,088,662 A | 7/2000 | Flinsbaugh et al. | |
| 6,134,667 A | 10/2000 | Suzuki et al. | |
| 6,421,354 B1 | 7/2002 | Godlewski | |
| 6,571,310 B1 | 5/2003 | Ottesen et al. | |
| 6,856,139 B2 | 2/2005 | Rijken et al. | |
| 7,729,107 B2 * | 6/2010 | Atkins | G06F 1/184 324/210 |
| 8,324,907 B2 * | 12/2012 | Ziegler | G01R 31/04 324/538 |
| 8,606,428 B2 * | 12/2013 | Chan | H05K 7/20518 361/679.48 |
| 8,628,239 B2 * | 1/2014 | Merrow | G01K 1/146 374/141 |
| 2004/0201318 A1 | 10/2004 | Wong | |
| 2008/0128387 A1 | 6/2008 | Chen et al. | |

* cited by examiner

*Primary Examiner* — Robert Carpenter
(74) *Attorney, Agent, or Firm* — Larson Newman, LLP

(57) ABSTRACT

An information handling system includes an electrical connector to mate with terminals of a data storage device. The system further includes a temperature sensor integrated at the electrical connector. The temperature sensor is arranged to thermally couple to an exterior surface of the data storage device when the data storage device is fully inserted into the electrical connector.

20 Claims, 4 Drawing Sheets

DATA STORAGE DEVICE CONNECTOR WITH INTEGRATED TEMPERATURE SENSOR

FIELD OF THE DISCLOSURE

This disclosure generally relates to information handling systems, and more particularly relates to a data storage device connector with an integrated temperature sensor.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-7 illustrate techniques for monitoring temperatures of data storage devices, such as hard disk drives, solid state drives, and the like. The temperature information can be accessed without interfering with normal data accesses at the devices, referred to herein as out-of-band temperature acquisition. The temperature information can be used to regulate operation of cooling fans and other thermal management protocols at an information handling system. Compact data storage device enclosures having low thermal mass can exhibit a rapid increase in temperature during operation. Accordingly, frequent polling or continuous monitoring of device temperature can be advantageous. As disclosed herein, a temperature sensing device is incorporated at an electrical connector that mates with terminals of a data storage device. The temperature sensor is integrated at the electrical connector and arranged to thermally couple to an exterior surface of the data storage device when the data storage device is fully inserted into the electrical connector. In one embodiment, the temperature sensor is in direct physical contact with the data storage device when the data storage device is fully inserted into the electrical connector. In another embodiment, heat from the data storage device is conducted to a temperature sensor at the electrical connector.

Figure 1:
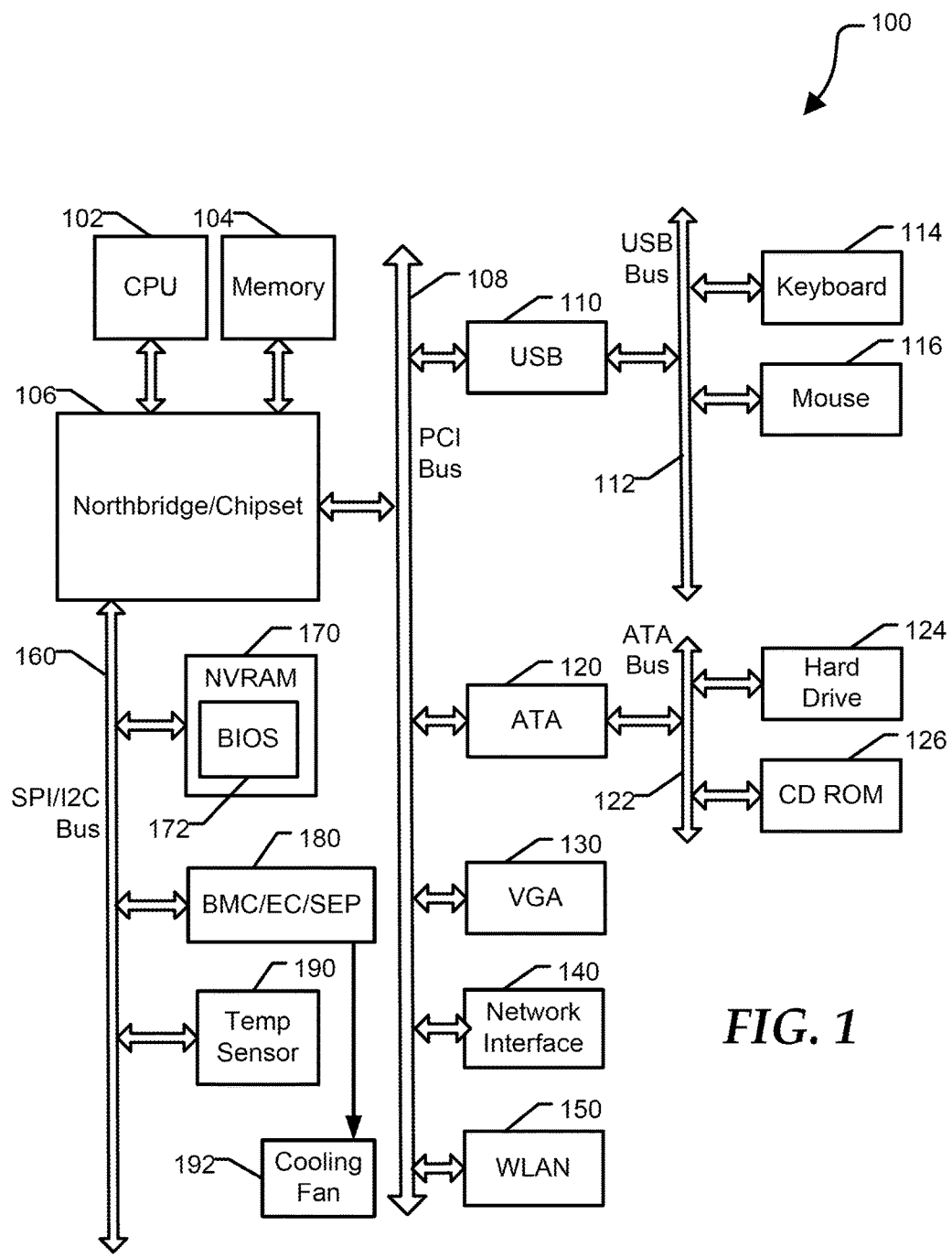
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a baseboard management controller (BMC) 180, temperature sensor 190 and a cooling fan 192.

BMC 180 can be referred to as a service processor, embedded controller (EC), a storage enclosure processor (SEP), and the like. Capabilities and functions provided by BMC 180 can vary considerably based on the type of information handling system. For example, the term baseboard management system is often used to describe an embedded processor included at a server, an embedded controller is more likely to be found in a consumer-level device, and a storage enclosure processor is usually associated with a data storage system. As disclosed herein, BMC 180 represents a processing device different from CPU 102, which provides various management functions for information handling system 100. For example, BMC 180 may be responsible for power management, cooling management, a remote configuration interface to system 100, and the like. System 100 can include multiple temperature sensors for monitoring operating temperature of components included at system 100, such as CPU 102, VGA 130, and hard drive 124.

System 100 can include additional processors (not shown at FIG. 1) that are configured to provide localized or specific control functions, such as a battery management controller. Bus 160 can include one or more busses, including an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Figure 2:
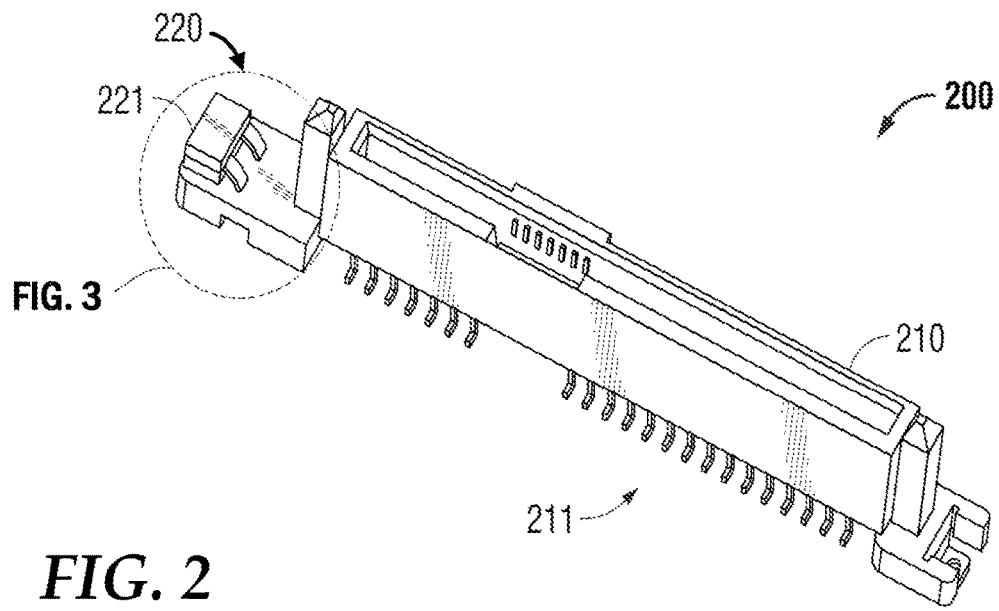
FIG. 2 is a perspective view of an electrical connector according to a specific embodiment of the present disclosure.

FIG. 2 shows an electrical connector assembly 200 including an electrical connector 210 configured to physically mate with terminals of a data storage device, and to communicate electrical signals between the data storage device and components at information handling system 100. Connector 210 includes pins 211 arranged to provide electrical connection to a printed circuit board, such as a back plane sub-assembly at system 100. Pins 210 can include through-hole pins or surface mount technology (SMT) style pins, which mate with conductors at a printed circuit board using solder. Connector 210 also includes a temperature sensor 221 that is configured to contact the data storage device enclosure when the data storage device is fully inserted into connector 210. Portion 220 of FIG. 200 is shown in FIG. 3.

Figure 3:
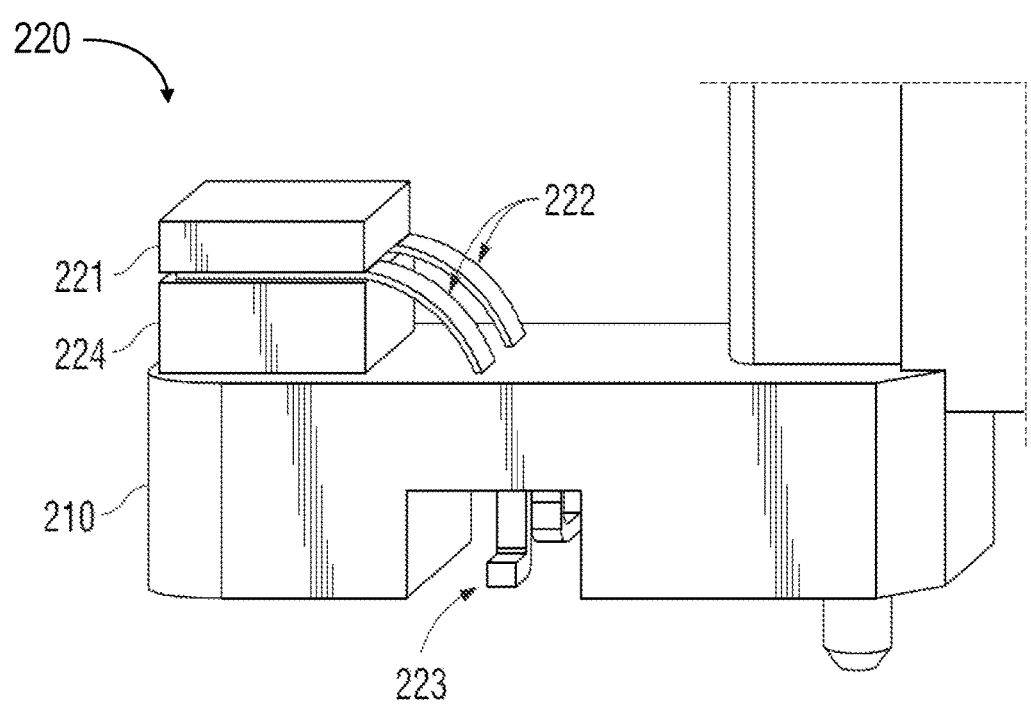
FIG. 3 is a perspective view of a portion of the electrical connector of FIG. 2 according to a specific embodiment of the present disclosure.

FIG. 3 shows a portion 220 of the electrical connector 210. Portion 220 includes temperature sensor 221. Temperature sensor 221 includes electrical leads 222, and terminals 223. Portion 220 also includes a resilient material 224. Resilient material 224 can include a polymer, rubber, or another elastic material that is configured to compress when force is applied to temperature sensor 221 by a data storage device that is inserted into connector 210, and to rebound to approximately an original thickness when the force is removed. Resilient material 224 is configured to provide a desired amount of force between temperature sensor 221 and a data storage device when the device is fully inserted into connector 210. The force maintained by material 224 on sensor 221 minimizes a thermal contact resistance between the data storage device and sensor 221 in order to achieve a more accurate temperature reading, and also prevents sensor 221 from being crushed when the data storage device is inserted into connector 210. As resilient material 224 is compressed, electrical leads 220 bend in a direction towards the body of connector 210. Accordingly, electrical leads 220 are configured to be flexible so as to withstand repeated insertions and removal of the data storage device from connector 210.

Temperature sensor 221 and associated components can be installed on either side of connector 210, or on both sides. For example, the location of sensor 221 can be selected based on thermal characteristics of the data storage device that will be mated to connector 210, such as a portion of the data storage device that most quickly responds to a temperature increase at the device, or a portion that best reflects an average operating temperature of the device. In one embodiment, the location of temperature sensor 221 is selected to coincide with a standardized thermocouple placement location used during system level thermal verification of information handling system 100.

Temperature sensor 221 can include a resistance temperature detector, a thermistor, a thermocouple, or another type of transducer capable of providing temperature information corresponding to a temperature at the surface of the sensor. For example, an electrical resistance of temperature sensor can be correlated to temperature. Temperature sensor 221 can be a passive device that does not receive power to operate, or sensor 221 can be an active device that receives external power to operate. For example, temperature sensor 221 can be configured to provide an analog or a digital indication of temperature. While two electrical leads 222 are shown, sensor 221 can include more than two leads. During operation, temperature information is provided by sensor 221 and the information is received at an analog or digital circuit for processing or analysis (not shown at FIG. 3). For example, an analog to digital converter can be used to generate a digital representation of temperature based on a change in resistance of sensor 221. In another embodiment, temperature sensor 221 or associated control circuitry can include an I2C, a SMBUS, or another interface to communicate temperature information to a controller, such as BMC 180.

Temperature sensor 221 can facilitate out-of-band measurement of data storage device temperature because the acquisition of the temperature information does not require interrupting normal read or write accesses at the storage device. In other words, a data storage system controller can access temperature sensor 221 without issuing a command to the data storage device over the device's communication interface. The temperature information can also provide an indication that an operational data storage device is presently inserted into connector 210. In one embodiment, a data storage enclosure can include a temperature sensor that is responsive to ambient or inlet air temperature. A temperature received from sensor 221 that is greater than a temperature received from the ambient sensor can indicate that a data storage device is inserted at connector 210. Alternatively, similar readings from the ambient sensor and sensor 221 can indicate that a data storage device is not inserted at connector 210 or that the data storage device is nonfunctional.

Figure 4:
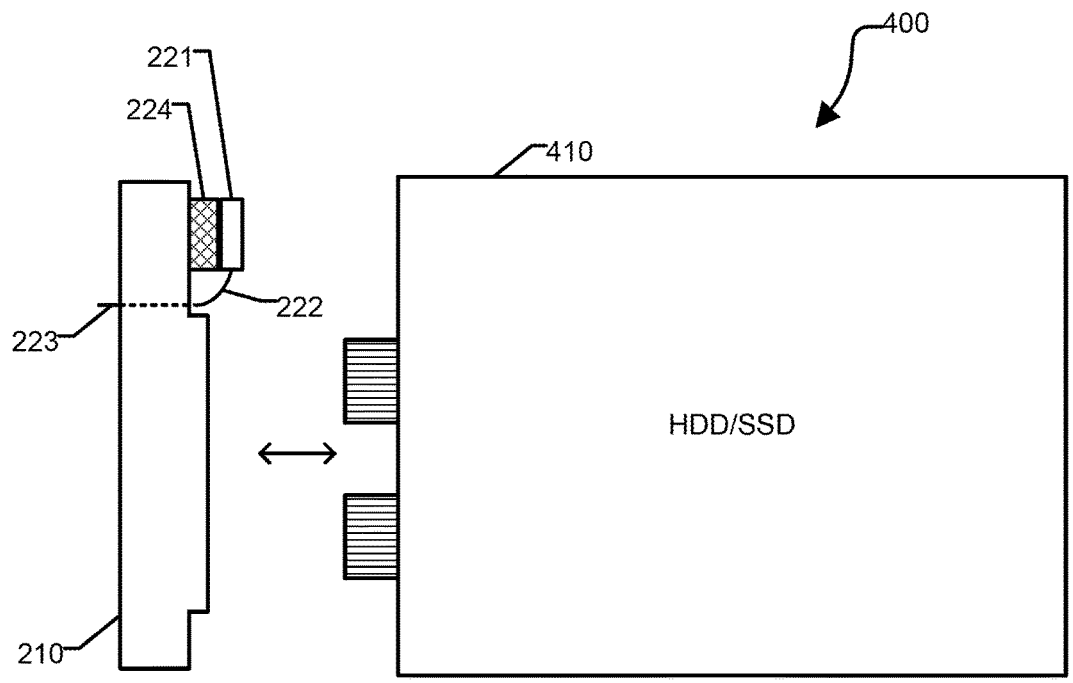
FIG. 4 is a block diagram illustrating operation of the electrical connector of FIG. 2 according to a specific embodiment of the present disclosure.
Figure 5:
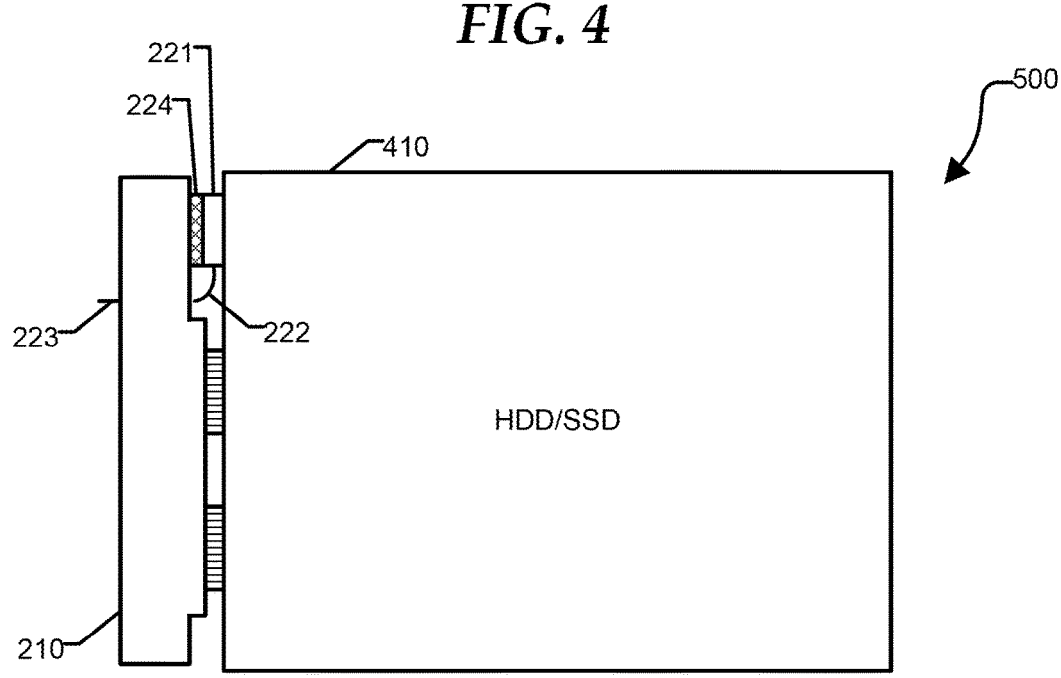
FIG. 5 is a block diagram illustrating operation of the electrical connector of FIG. 2 according to another embodiment of the present disclosure.

FIGS. 4 and 5 are block diagrams 400 and 500 showing operation of electrical connector 210 of FIG. 2 according to specific embodiments of the present disclosure. FIG. 4 illustrates connector 210 prior to insertion of a data storage device 410, while FIG. 5 illustrates connector 210 with data storage device 410 inserted into connector 210. Block diagrams 400 and 500 show electrical connector 210, which includes temperature sensor 221, resilient material 224, and electrical leads 222 and pins 223. As shown at FIG. 5, resilient material 224 is compressed, becoming thinner, when data storage device 410 is inserted into connector 210, and relaxes to an original thickness when device 410 is removed from connector 210. For clarity, an enclosure, backplane, and other chassis components are not shown in FIGS. 4 and 5. In particular, electrical connector 210 is typically soldered to a backplane printed circuit board, and the backplane can be installed in an enclosure, such as a server rack and the like. An enclosure typically includes a lever and latch mechanism that secures the data storage device in the enclosure, causing the data storage device to be driven against temperature sensor 221 while compressing resilient material 224.

Figure 6:
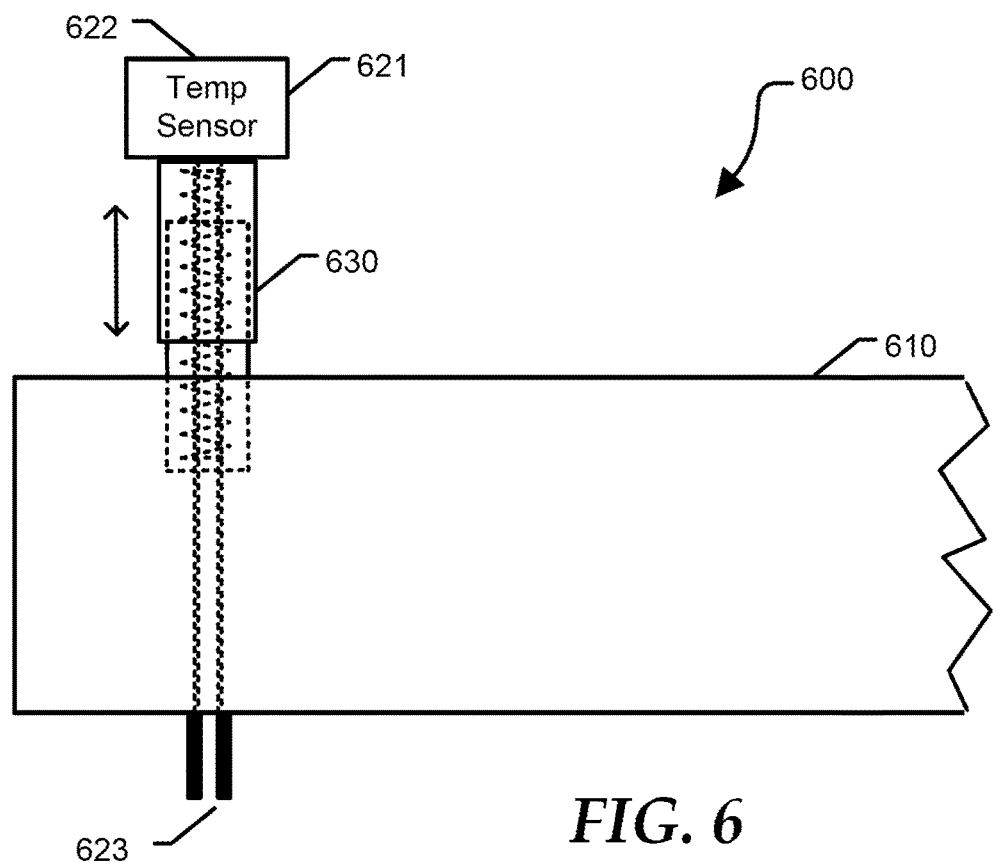
FIG. 6 is a side view of an electrical connector according to another embodiment of the present disclosure.

FIG. 6 shows an electrical connector assembly 600 including an electrical connector 610 having a temperature sensor 621 with a surface 622 that is in contact with an external surface of a data storage device when the device is inserted into connector 610, and pins 623 for communicating temperature information from sensor 621 to a controller. Electrical connector 610 is similar to connector 210 of FIGS. 2-5; however the resilient material is replaced with a spring-loaded telescoping member 630. Member 630 is configured to apply a desired amount of force to press temperature sensor 621 against the data storage device. As shown at FIG. 6, electrical leads of sensor 621 are routed to pins 623 within the body of member 630. Alternatively, signal leads from sensor 621 may be similar to those depicted in FIG. 3. One of skill will appreciate that the mechanism depicted in FIG. 6 is only one example of how spring-loaded telescoping member 630 can be implemented. For example, leaf springs can be used instead of coil springs, more than one telescoping member 630 can be used to support sensor 621, and the like. For another example, a plastic or metal guide structure, similar to a keyboard switch mechanism, can be used to enclose member 630 and to limit movement to the axis of member 630.

Figure 7:
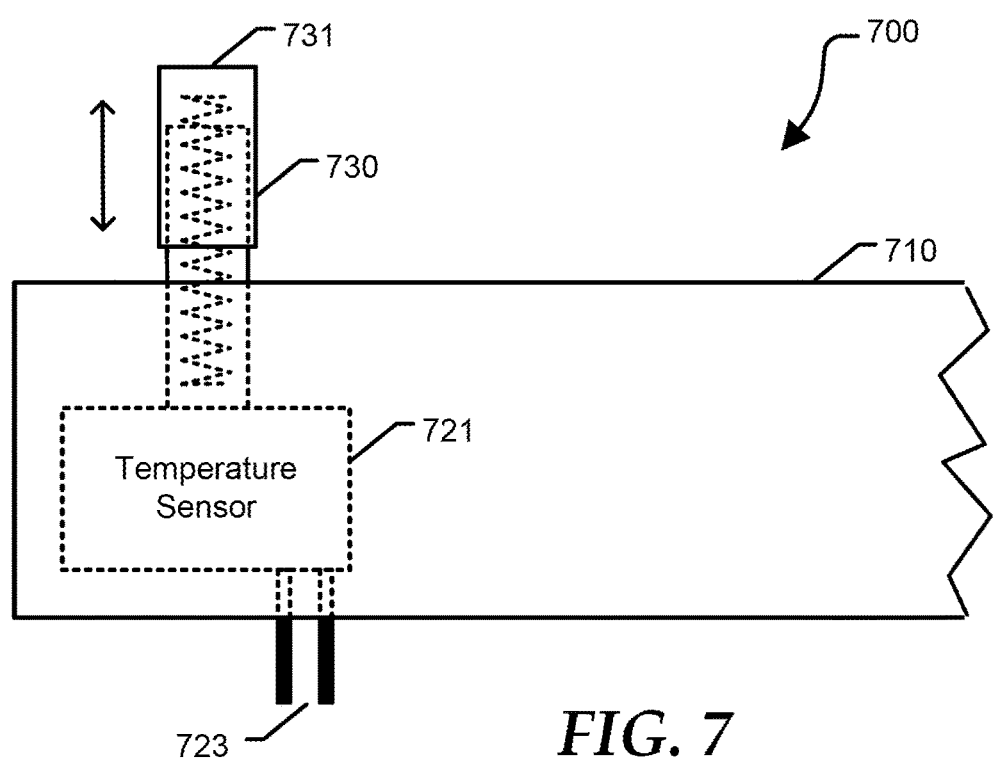
FIG. 7 is a side view of an electrical connector according to still another embodiment of present disclosure.

FIG. 7 shows an electrical connector assembly 700 including a connector 710 having a temperature sensor 721 that is inside the molded body of connector 710. Alternatively, temperature sensor can be installed at an opening at the bottom of connector 710. Connector 710 also includes a spring-loaded thermally conductive conduit 730 having a surface, which is in contact with an external surface of a data storage device when the device is inserted into connector 710, and pins 723 for communicating temperature information from sensor 721 to a controller. In one embodiment, conduit 730 can include copper to facilitate thermal conductivity. In another embodiment, conduit 730 can include a heat pipe. During operation, heat from a data storage device that is in contact with surface 731 is conducted to temperature sensor 721. Temperature information received from sensor 721 can be manipulated to compensate for a thermal resistance of conduit 730. As described above with reference to member 630, conduit 730 can include a leaf spring to provide the desired force against the data storage device while providing thermal conductivity between the data storage device and temperature sensor 721.

Referring back to FIG. 1, the information handling system 100 can include a set of instructions that can be executed to cause the information handling system to perform any one or more of the methods or computer based functions disclosed herein. Information handling system 100 may operate as a standalone device or may be connected to other computer systems or peripheral devices, such as by a network.

In a networked deployment, information handling system 100 may operate in the capacity of a server or as a client user computer in a server-client user network environment, or as a peer computer system in a peer-to-peer (or distributed) network environment. Information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
an enclosure including a chassis component to physically secure a data storage device, the enclosure including a backplane;
an electrical connector physically attached to the backplane and configured to mate with terminals of a data storage device to couple electrical signals from the terminals to the backplane; and
a temperature sensor integrated at the electrical connector, the temperature sensor arranged to thermally couple to an exterior surface of the data storage device when the data storage device is fully inserted into the electrical connector.

2. The system of claim 1, wherein the temperature sensor is in direct physical contact with the data storage device when the data storage device is fully inserted into the electrical connector.

3. The system of claim 2, wherein the temperature sensor is coupled to the electrical connector via a resilient material that is compressed when the data storage device is fully inserted into the electrical connector.

4. The system of claim 2, wherein signal leads of the temperature sensor are routed through the electrical connector and adapted to interface to the backplane in the same manner as signal leads corresponding to the data storage device.

5. The system of claim 1, further comprising:
a cooling fan; and
a service processor configured to operate out-of-band with respect to a primary central processing unit at the information handling system, the service processor coupled to the cooling fan and to the temperature sensor, the service processor to acquire temperature information corresponding to the data storage device from the temperature sensor and regulate operation of the cooling fan based on the temperature information.

6. The system of claim 1, wherein temperature information corresponding to the data storage device is acquired from the temperature sensor without interrupting data accesses at the data storage device.

7. The system of claim 1, wherein the temperature sensor is located within a molded body of the electrical connector, the temperature sensor thermally coupled to the data storage device by a spring-loaded thermally conductive conduit.

8. The system of claim 1, wherein the electrical connector is an interposer to couple the data storage device to a second electrical connector attached to the chassis component of the information handling system, and wherein signals provided by the temperature sensor are propagated through the interposer to the second electrical connector.

9. The system of claim 1, further comprising:
an electronic component to aggregate temperature information received from a plurality of temperature sensors including the temperature sensor.

10. An electrical connector comprising:
signal conductors to communicate signals from terminals of a data storage device to a backplane at an information handling system enclosure, the enclosure including a chassis component to physically secure the data storage device at the information handling system; and
a temperature sensor integrated at the electrical connector and arranged to thermally couple to an exterior surface of the data storage device when the data storage device is fully inserted into the electrical connector, wherein the electrical connector is physically attached to the backplane.

11. The connector of claim 10, wherein the temperature sensor is in direct physical contact with the data storage device when the data storage device is fully inserted into the electrical connector.

12. The connector of claim 11, wherein the temperature sensor is coupled to the electrical connector via a resilient material that is compressed when the data storage device when the data storage device is fully inserted into the electrical connector.

13. The connector of claim 11, wherein temperature information corresponding to the data storage device is acquired from the temperature sensor without interrupting data accesses at the data storage device, the temperature information further providing an indication that an operational data storage device is presently inserted at the electrical connector.

14. The connector of claim 10, wherein signal leads of the temperature sensor are adapted to interface to the backplane in the same manner as the signal conductors corresponding to the data storage device.

15. The connector of claim 10, wherein:
the temperature sensor is located within a molded body of the electrical connector, the temperature sensor thermally coupled to the data storage device by a thermally conductive conduit; and
signal leads of the temperature sensor are adapted to interface to the backplane in the same manner as signal leads corresponding to the data storage device.

16. The connector of claim 10, wherein the electrical connector is an interposer to couple the data storage device to a second electrical connector attached to the chassis component of the information handling system, and wherein signals provided by the temperature sensor are propagated through the interposer to the second electrical connector.

17. A data storage enclosure comprising:
a chassis component to physically secure a first data storage device at the enclosure;
a backplane; and
a first electrical connector physically attached to the backplane and configured to communicate signals from terminals of the data storage device to the backplane, the first electrical connector including a first temperature sensor integrated at the first electrical connector, the first temperature sensor arranged to thermally couple to an exterior surface of a first data storage device when the first data storage device is fully inserted into the first electrical connector.

18. The enclosure of claim 17, further comprising:
a second electrical connector to interface a second data storage device to the backplane, the second electrical connector comprising a second temperature sensor integrated at the electrical connector, the second temperature sensor arranged to thermally couple to an exterior surface of a second data storage device when the second data storage device is fully inserted into the second electrical connector; and
a thermal management device to aggregate temperature information received from the first temperature sensor and from the second temperature sensor.

19. The enclosure of claim 17, wherein the temperature sensor is in direct physical contact with the data storage device when the data storage device is fully inserted into the electrical connector.

20. The enclosure of claim 17, wherein temperature information corresponding to the data storage device is acquired from the temperature sensor without interrupting data accesses at the data storage device.

* * * * *